Oct. 12, 1937.   O. E. MILLER   2,095,826
METHOD AND APPARATUS FOR PRINTING LENTICULAR FILM
Filed Oct. 31, 1935
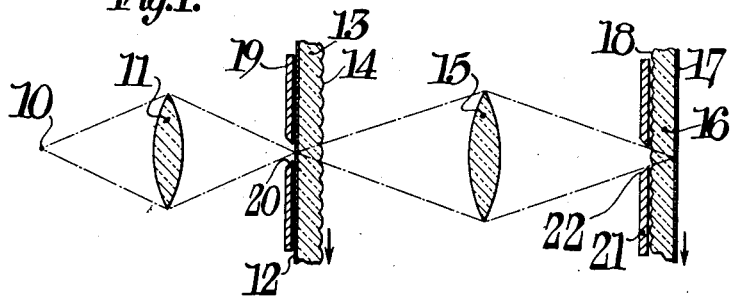
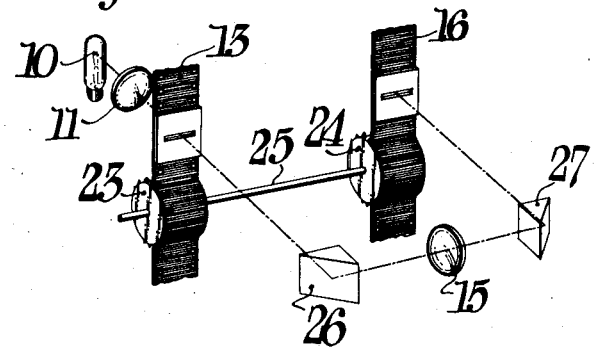
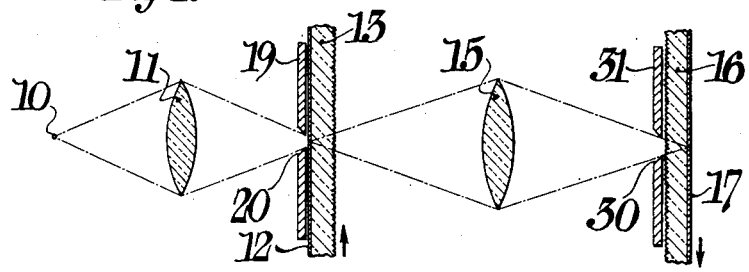
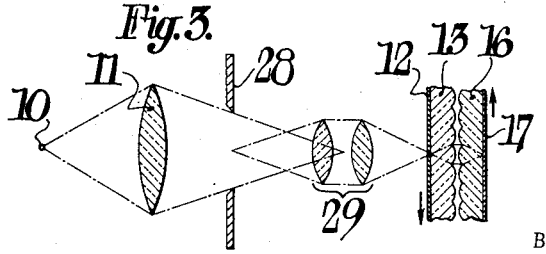
INVENTOR:
Oran E. Miller,
BY
ATTORNEYS.

Patented Oct. 12, 1937

2,095,826

UNITED STATES PATENT OFFICE 2,095,826

METHOD AND APPARATUS FOR PRINTING LENTICULAR FILM

Oran E. Miller, Rochester, N. Y., assignor, by mesne assignments, to Eastman Kodak Company, Jersey City, N. J., a corporation of New Jersey Application October 31, 1935, Serial No. 47,646

5 Claims. (Cl. 88—24)

My present invention relates to photographic printing and more particularly to the copying or duplicating of lenticular film. In the printing of lenticular film carrying a plurality of color separation images behind each lenticulation, a number of difficulties are encountered which are entirely absent from the printing of ordinary black and white pictures. These difficulties mainly reside in the elimination of certain defects, the most common of which are (1) color wedging, (2) moiré pattern, and (3) lack of color separation. A number of arrangements have been proposed and devised for overcoming these faults, and although some of these arrangements are operable, they are almost without exception elaborate and costly, slow down the printing speed, and for other reasons, including the structure requirements imposed upon the objective lens in projected printing, are not entirely practical or satisfactory.

The method and apparatus of the present invention is capable of printing lenticular film without running into the above mentioned difficulties. In practicing the invention, both the original and the copy films are embossed with cylindrical lenticulations extending transversely of the films, and both films are advanced with a uniform motion and at the same speed through the printing position, while causing a slight relative movement between the copy film and the image of the original formed on the copy film, this movement being in a direction which is perpendicular to the lenticulations and longitudinally of the film. With this arrangement the moiré pattern is eliminated and when applied to projection printing it permits simplification of the objective lens and makes it possible to produce a copy which is geometrically similar to the original, so that the copy can be projected with identically the same system or its equivalent, that was used in taking the original film.

The novel features which I believe to be characteristic of my invention, are set forth with particularity in the appended claims. My invention itself, however, both as to its organization and method of operation, will best be understood by reference to the following description taken in connection with the accompanying drawing, in which:

Figure 1 illustrates schematically an optical printing arrangement in which the two films move uniformly and in the same direction, through the printing position;

Figure 2 is a diagrammatic showing of one suitable mechanical and optical arrangement for practicing the process illustrated in Figure 1;

Figure 3 illustrates schematically the process as applied to contact printing and shows an illuminating system which may be substituted for that shown in Figures 1 and 2; and Figure 4 is a schematic showing of a suitable arrangement for practicing a modification of the process.

Referring to the drawing, I have shown in Figure 1 an arrangement for the optical printing of transversely lenticulated film in accordance with the invention. A source of light 10, preferably being a single filament lamp with the filament extending parallel to the film embossing, is imaged by a condenser lens 11 on the image layer 12 of an original film 13, provided with transverse lenticulations 14 through which the image layer 12 was originally exposed in a well-known manner. The condenser lens 11 is preferably but not necessarily of the same relative aperture as the objective lens 15, employed for imaging the original film 13 onto a copy film 16 provided with a sensitive layer 17, and on its opposite side with transverse lenticulations 18. The illumination of the image layer 12 of the original film 13 is restricted to an area equal to that lying behind a single lenticular element and this may be accomplished by means of a suitable mask 19 in which is provided a slit 20 having a width exactly equal to the width of a single lenticulation. It will be understood that this physical slit may be replaced by any suitable so-called slitless system, such as will be described in connection with Figure 3. This portion of the original film 13, which is illuminated, is imaged by the objective 15 onto the copy film 16 and a suitable mask 21 provided with a slit 22 may be provided to limit the light falling on the copy film 16 to a width equal to that of a single embossing 18. The two films 13 and 16 are moved continuously by any suitable well-known mechanism at a uniform speed and in the same direction as indicated by the arrows. This mechanism and optical system may, if desired, take the form shown in Figure 2, in which the films 13 and 16 are arranged in the same plane and moved by sprockets 23 and 24 which are mounted on a single shaft 25. The light leaving the film 13 is directed through the objective 15 and to the copy film 16 by means of prisms 26 and 27.

With the above arrangement it will be evident that the copy film 16 and the image of the film 13 formed thereon, are coincident and travel in opposite directions so that the lenticulations of the original film are not resolved on the copy film, and hence, there is no resulting moiré pattern. The picture is recorded point by point in the direction of motion and since the films are moved in the same direction, the recorded image is not inverted. Although the picture on the copy film 16 is reversed right and left, the embossings of the two films face opposite directions, and this results in the print being recorded geometrically similar to the original.

With the arrangement just described, there can be no color wedging or "cat-eye" diaphragming of parts of the objective, since the printing is done only along an axis parallel to the lenticulations, and this eliminates the need for compensating lenses to correct the convergence or divergence of the elementary beams from different elements of the picture. This is true because each element is recorded from the same position relative to the lens as any other element, and the axes of the elementary beams from different portions of the picture areas, have the same convergence or divergence as in the original film. This condition greatly simplifies the optical requirements of the objective lens, since the only unusual requirement is that it must have a relative aperture at least equal to that of the lens and filter combination used in taking the original film 13.

Since the illumination of the original film 13 is restricted to be equal to the width of a single embossed element, the illumination showing on the objective 15 and its distribution thereon, will be entirely independent of the movement of the film and dependent only on the color values recorded in the image layer 12 of the original film 13.

The method described above in connection with optical printing may be applied to contact printing by moving the two films 13 and 16 in opposite directions, as indicated by the arrows in Figure 3, and with their embossed surfaces substantially in contact. As was the case in connection with the description of Figures 1 and 2, the illumination of the original film 13 is restricted to an area equal to the width of a single lenticulation, and in this arrangement a slit defined by a mask 28 is imaged by a suitable objective 29 onto the image layer 12 of the original film 13. The conditions which this illuminating system must meet are, that regardless of the actual size of the illuminating slit, its image on the layer 12 will be of a width equal to one lenticular element of the film. In this arrangement, the image of the original film 13 will move in a direction opposite to the film 16, with a resulting elimination of any moiré pattern for the same reason as was explained in connection with the arrangement shown in Figure 1. In the former arrangement the two films are moved in the same direction, but of course, the image formed on the copy film 16 moves in a direction opposite to that of the film 16.

In Figure 4, I have shown a modified arrangement in which the same general optical system, as shown in Figures 1 and 2, may be employed, but in which the two films 13 and 16 are moved in opposite directions, as indicated by the arrows. This, of course, results in the image projected by the objective 15 moving in the same direction as the copy film 16. If the magnification were exactly unity, then moiré would appear in the printed film, but if the relationship between the magnification of the picture and the width of the slit 30, in front of the copy film and defined by a mask 31, is made an amount such that the movement of the projected image is greater or less than the movement of the copy film 16 by the width of one embossed element during the time required for one element to pass the slit 30, then no moiré pattern will appear in the copy film 16. Thus, if there are thirty-two embossed elements per millimeter on the film 16 and if the magnification is made to equal 31/32 or 33/32, it will be evident that the moiré pattern is eliminated without any greater loss of definition than is suffered by any of the other known methods for eliminating moire. The arrangement shown in Figure 4 will result in a print which is not similar to the original, but this may easily be corrected by inverting the banded filter in projection, and by providing the optical system in the printer with a single lateral reflection to take care of the lateral inversion of the picture.

In this arrangement the printing slits are preferably kept narrow enough so that it is safe to assume that all of the printing is being done on the axis of the projection lens 15, and in this case, the optical requirements for the printing objective are no more severe than was the case of printing with the films moving in the same direction. The fact that the arrangement last described permits the simultaneous illumination of a considerable number of lenticulations, gives it a distinct advantage over the other forms, because less printing light is required and it would be possible to print at much higher speeds.

In the interests of clarity, the structure and film handling mechanism for advancing the films in the manner desired have not been illustrated, since to do so would tend to hide rather than make clear the novel features of my invention. Anyone skilled in the art can readily provide any of several well-known means for advancing the two films continuously and at the same uniform speed.

While I have shown and described certain preferred arrangements for practicing my invention, it is to be understood that I do not intend to be limited thereby, but to include within the scope of the appended claims the various modifications thereof which will become obvious to those skilled in this art, from the teachings of my invention.

Having now described my invention, what I claim as new and desire to secure by Letters Patent of the United States is:

1. The method of preparing a print on a sensitive linearly lenticular film from an original linearly lenticular film which comprises arranging the two films with their lenticular surfaces facing each other, continuously moving the films perpendicularly to the axes of their lenticulations and at the same speed, past an exposure aperture of a height equal to the width of a single lenticulation and in such directions that the lenticulations of the original film are not resolved in the print, whereby no moiré pattern appears in the print.

2. The method of preparing a print on a sensitive linearly lenticular film from an original linearly lenticular film which comprises arranging the two films with their lenticular surfaces facing each other, continuously moving the films perpendicularly to the axes of their lenticulations and at the same speed through an exposure position, projecting on the sensitive film an image of the original film at a magnification such that the movement of the image differs from the movement of the sensitive film by the height of one lenticular element during the passage of said element through the exposure position.

3. The method of copying images from one film onto a copy film, both of which films have cylindrical lenticulations extending transversely of their lengths, which comprises advancing the films with their lenticulations substantially in contact at the same speed and in opposite directions through a beam of light while restricting the thickness of the light beam to the width of a single lenticulation on said films.

4. The method of copying images from one film onto a copy film, both of which films have cylindrical lenticulations extending transversely of their lengths, which comprises advancing the films with the lenticulations of one facing the lenticulations of the other, at the same speed and in opposite directions optically and through a beam of light having a thickness equal to the width of one lenticulation, whereby the lenticulations are not resolved in the copy film and no moiré pattern is recorded.

5. The method of duplicating color pictures on lenticular film by printing on sensitive lenticular film, the lenticulations on both films extending transversely of their lengths, which comprises illuminating the image side of the original film with a beam of light whose thickness equals the width of a single lenticulation, restricting the light falling on the sensitive film to an area whose dimensions are the same as the dimensions of a single lenticulation and uniformly advancing the films at the same speed in optically opposite directions.

ORAN E. MILLER.